United States Patent [19]

Leverett

[11] Patent Number: 5,677,516
[45] Date of Patent: Oct. 14, 1997

[54] ARTICLE WEIGHING AND SORTING APPARATUS WITH IMPROVED WEIGH CUP

[75] Inventor: William H. Leverett, Greenville, Ga.

[73] Assignee: Durand-Wayland, Inc., LaGrange, Ga.

[21] Appl. No.: 294,641

[22] Filed: Aug. 23, 1994

[51] Int. Cl.⁶ .......................... G01G 13/00; G01G 19/00; B65G 37/00
[52] U.S. Cl. .................... 177/52; 177/145; 198/370.04; 209/593
[58] Field of Search .................. 177/52, 145, 262, 177/263; 209/593, 643; 198/370.04

[56] References Cited

U.S. PATENT DOCUMENTS

| | | | |
|---|---|---|---|
| 2,980,252 | 4/1961 | Bray et al. | 177/145 |
| 3,770,111 | 11/1973 | Greenwood et al. | 209/73 |
| 4,262,807 | 4/1981 | Leverett | 209/593 |
| 4,403,669 | 9/1983 | Raz | 177/145 |
| 4,660,665 | 4/1987 | Powell, Jr. | 177/145 |
| 4,872,564 | 10/1989 | van der Schoot | 209/511 |
| 4,940,536 | 7/1990 | Cowlin et al. | 209/592 |
| 5,020,675 | 6/1991 | Cowlin et al. | 209/538 |
| 5,244,100 | 9/1993 | Regier et al. | 209/593 |
| 5,267,654 | 12/1993 | Leverett | 177/145 X |
| 5,294,004 | 3/1994 | Leverett | 209/593 X |

*Primary Examiner*—Michael L. Gellner
*Assistant Examiner*—Randy W. Gibson
*Attorney, Agent, or Firm*—Jones & Askew, LLP

[57] ABSTRACT

Weighing and sorting apparatus for articles such as fruit or the like, and an improved weigh cup for use therewith. The weigh cups move along a predetermined path including a scale that weighs each cup and its contents. The cups are supported on the weigh scale only along a line coincident with the lateral center of gravity of the cup, allowing each weighing operation to commence as soon as that single support for the cup moves onto a weigh platform. Each cup includes a stabilizer arm to maintain the cup in an upright attitude notwithstanding the single support at the lateral center of gravity.

29 Claims, 7 Drawing Sheets

FIG. 9

ARTICLE WEIGHING AND SORTING APPARATUS WITH IMPROVED WEIGH CUP

FIELD OF THE INVENTION

This invention relates in general to apparatus for weighing or sorting articles, and relates in particular to apparatus for weighing or sorting agricultural products such as fruit or the like.

BACKGROUND OF THE INVENTION

Mechanized apparatus for sorting or grading agricultural products such as apples and citrus products are well-known in the art. These machines typically evaluate each individual article by one or more parameters such as weight, color, or physical size, and then segregate or sort those articles according to the measured parameter. Where the articles are being packed in bags or other packages having a predetermined nominal weight, e.g., 5-lb. or 10-lb. bags, machines are known that will weigh each individual article and then dispense the weighed articles into selected packages so as to minimize the amount that the aggregate weight in the package exceeds the nominal packed weight. Of course, the actual packed weight cannot be less than the nominal weight. One example of such weighing apparatus is found in U.S. Pat. No. 4,262,807 entitled "Process and Apparatus for Weighing and Sorting Articles" and assigned to Durand-Wayland, Inc., the assignee of the present invention.

In article weighing apparatus such as disclosed in the aforementioned patent, each individual article is deposited in a cup and the cup with its article is weighed as the cup is conveyed along a predetermined path. The known weight of each individual cup then is subtracted from the measured gross weight of the cup and its contents, to determine the net weight of the article carried by that cup. In typical weighing apparatus, the individual cups then are conveyed beyond the weighing station to one or more discharge stations, where the weighed articles are discharged from the cups for packing according to the measured weights of the individual articles.

Typical weigh cups used in article weighing apparatus of the prior art are disclosed in the aforementioned '807 patent. These cups ride along a pair of laterally spaced-apart tracks or rails as a pair of conveyors carry the cups on a predetermined path. The weigh scale, located along that track, includes a rail section connected to a weight sensor such as a load cell or the like that produces an electrical signal in response to the weight of each cup, and an article contained in the cup, traveling on the rail segment. Each cup includes pins or other structural elements located forwardly and rearwardly of the center of gravity of the cup to support the cups on the rails in a stable manner as the cups are conveyed along the rails, including the rail segment associated with the load cell. A tow bar driven by the conveyors moves each cup along the rails through a connection allowing the cup to move vertically as the cup traverses the rail section of the weighing scale, so that the tow bar does not provide any support for the weight of the cup and its contents.

The full weight of each cup must be supported by the load cell for some predetermined minimum amount of time before the load cell can produce an accurate signal indicating the measured weight of that cup. This time is required to settle out the mechanical and electrical perturbances produced as each cup moves onto the rail segment associated with the load cell. Because weigh cups known in the prior art, as exemplified by those disclosed in the aforementioned '807 patent, require support elements located substantially fore and aft of the transverse center of gravity of the cup to provide stable support of the cup on the rails, the full weight of the cup and its contents is not applied to the weigh scale until all the support elements have moved onto the rail segments associated with the weigh scale. As a result, the settling-out time allotted for obtaining an accurate weight signal from the load cell cannot commence until every cup support element has entered the rail segment associated with the scale. Those cup support elements then must remain on the rail segments for a sufficient time to complete the settling-out process and obtain an accurate weight signal. Because the cups are weighed on the fly, that is, while each individual cup is moving along the rails including the rail segment associated with the weigh scale, the requirement for a certain minimum dwell time on the scale limits the maximum travel speed of the cups and their conveyor. If each individual cup moves across the rail segment at too great a speed, the dwell time each cup is fully supported on the rail segment becomes insufficient to produce an accurate signal corresponding to the weight of the cup and its contents. This has become a limiting factor in the operating speed of the known article weighing apparatus, and thus in the productivity of that apparatus.

It may also be necessary or desired to inspect other attributes of fruit or the like, in addition to weighing the individual articles. For example, it is known in the art to inspect the appearance of each article, instead of or in addition to weighing the individual articles. This optical inspection may determine the color of individual fruit or vegetables, corresponding to the degree of ripeness or to some other attribute useful for grading or selecting the articles. While these optical inspections in the past have been visual inspections by human operators, it has become acceptable to provide optical inspection through the use of a video camera positioned to scan each individual article moving along a conveyor line. The electrical signals produced by the camera are processed in a known manner to evaluate a parameter of the articles.

When optically inspecting fruit or other articles that may have a nonuniform coloration, it is considered desirable to rotate the article undergoing optical inspection. This procedure makes the optical inspection more representative of the whole article, and makes it less likely that localized visual abnormalities or imperfections will escape detection. It is known for that purpose to use article holders that operate to rotate the fruit as the holders move through an optical-inspection zone. However, the rotatable holders are not required after the articles leave the inspection zone, and there is no need for the holders to accompany the fruit to a weighing zone and discharge stations subsequent to me optical-inspection zone.

SUMMARY OF THE INVENTION

Accordingly, it is an object of the present invention to provide improved apparatus for inspecting articles such as fruit or the like.

It is another object of this invention to provide an improved article-holding cup for apparatus used in weighing or grading articles such as fruit or the like.

It is still another object of the present invention to provide an improved article-receiving cup for weighing articles such as fruit or the like.

It is a further object of the present invention to provide an article-receiving cup that reduces the time needed to determine the weight of an article carried by the cup.

It is still a further object of the present invention to provide an improved apparatus for optical inspection and weighing of articles such as fruit or the like.

The foregoing and other objects of the present invention are met by apparatus as described herein. Stated in somewhat general terms, the present invention includes an article-receiving cup that engages rails or other weight-supporting surface substantially only at the center of gravity of the cup. The entire weight of each cup and its contents thus is immediately applied to a load cell or other weighing device, as soon as the support element at the center of gravity moves onto the rail segments or other weigh platform associated with the load cell. A stabilizing member is associated with each cup to keep the cup in a substantially upright attitude and to prevent the cup from tipping, as the cup is supported only at its center of gravity. The weighing operation, and in particular the initial settling-out time associated with the weighing apparatus, can commence as soon as the single-location support element moves onto the scale, instead of waiting for all elements of a multiple-element support structure to move onto the scale as with weigh cups of the prior art.

Stated in somewhat greater detail, each cup has on its underside at least one support element with a surface extending transversely of the cup and located at the lateral center of gravity of the cup. This support surface supports the weight of the cup and its contents as the cup rides along a pair of laterally spaced-apart rails extending along the path of the cups and forming part of the apparatus incorporating the cups. The support surface is interrupted to form two separate segments in a preferred embodiment of the present invention, so that the cup support element has a separate support surface on each side of the longitudinal center line of the cup. However, those separate support surfaces are aligned with each other and are coincident with the lateral center of gravity of the cup. Each separate support surface thus engages a separate rail of the apparatus to support the cup on those rails.

The cups in the present invention are conveyed along a predetermined path by a conveyor that travels alongside the path. This conveyor preferably is located outside the parallel rails on which the cup travels. A connecting arm extends beyond one side of the cup and confronts a bracket extending upwardly from the conveyor, at a location corresponding to each cup. The bracket pivotably engages one end of a stabilizing bracket that extends to the cup, where another end of the bracket engages the cup. The arm of the cup also engages the one end of the stabilizing bracket, with a lost-motion connection that allows the cup a predetermined range of vertical movement relative to the stabilizing member and the conveyor bracket. This range of vertical movement allows the cup, in effect, to float in the vertical axis, independent from the conveyor or the chain bracket, as the support surface of the cup move onto the rail segments connected to the load cell or other weighing mechanism. The stabilizing arm maintains the cup in an upright attitude while the conveyor chain moves the cup along the predetermined path, because the center-of-gravity support surface of the cup itself would not keep the cup upright on the rails.

Each cup is pivotably attached to the corresponding conveyor bracket, in addition to the lost-motion connection allowing a limited extent of vertical movement as mentioned above. This pivotable attachment allows each cup to be pivoted from its normal horizontal position for supporting articles, to an angularly-elevated attitude that ejects the article from the cup. This vertical tipping movement of each cup is controlled by engagement of a tipping element extending downwardly from the cup, with a cam member mounted on the sorting apparatus and controlled in response to weight or other parameters associated with the articles being carried by the cups.

Each cup according to the present invention travels in an endless path along a substantially vertical plane. Optical inspection of articles can take place at a first portion of that path, and for that purpose a second conveyor coincident with the first conveyor extends along only an initial portion of that path. This second conveyor moves a number of roller assemblies that support and rotate fruit or other articles for optical inspection. Each roller assembly carried by the second conveyor is interlaced with a weigh cup moved by the first conveyor, and the roller assemblies are elevated relative to the cups so that each article is selectively supported above a particular weigh cup by the roller assemblies immediately preceding and following that cup. After the interlaced roller assemblies and cups move beyond a predetermined zone for optical inspection, the second conveyor descends to withdraw the roller assemblies from the path of the weigh cups. As a result, each article previously born by a pair of roller assemblies becomes lowered onto a cup located between those roller assemblies, and that cup moves onward to enter a weighing zone for weighing as discussed above.

The foregoing and other aspects of the present invention will become more readily apparent from the following description of a preferred embodiment.

DETAILED DESCRIPTION OF PREFERRED EMBODIMENT

Figure 1:
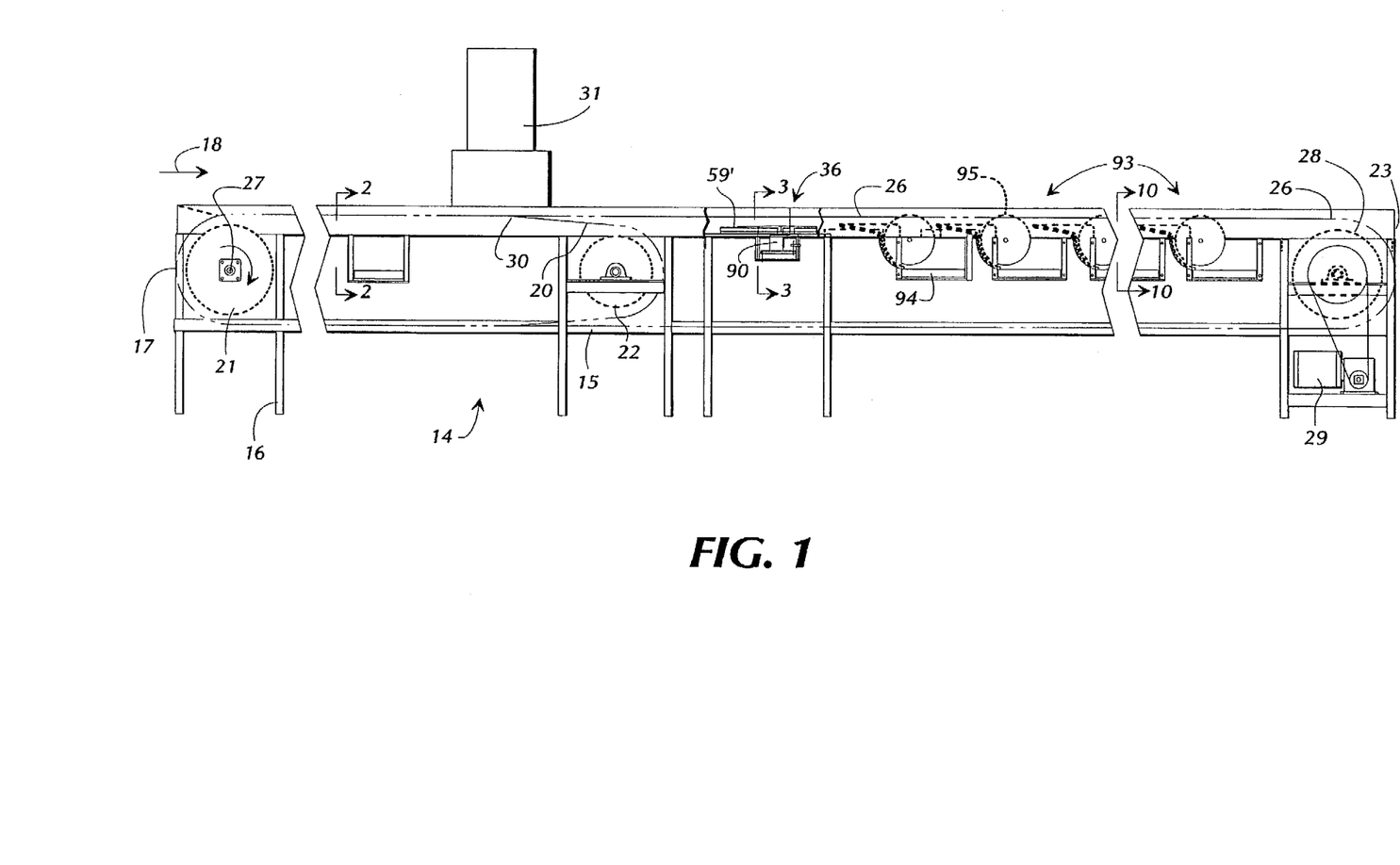
FIG. 1 shows a side elevation view, partially broken away and sectioned for illustrative purposes, of an article weighing and sorting apparatus according to a preferred embodiment of the present invention.

Turning first to FIG. 1, a weighing and sorting apparatus is shown generally at 14 and includes a frame assembly 15 supported above a floor by a number of upright supports 16. In use, the head end 17 of the apparatus is located near a machine for delivering individual articles of fruit or the like to the individual cups of the present apparatus. Such machines are known to the art as singulators and are not further described herein. The arrow 18 identifies the flow of individual articles into the present weighing and sorting apparatus 14.

The sorting and weighing apparatus 14 has two synchronized endless-chain conveyor lines of unequal length supported by the frame 15. The first of these conveyor lines includes an endless chain 20 identified herein as the wheel assembly chain and extending from the sprocket 21 at the head end 17 of the frame to the sprocket 22 located between the head end and the tail end 23 of the frame assembly. The first conveyor comprised by the wheel assembly chain 20 thus extends along only an initial portion of the frame assembly, as is apparent from FIG. 1.

The second conveyor includes an endless chain 26 hereinafter referred to as the cup assembly chain and extending substantially the entire length of the frame assembly 15. At the head end 17 of the frame assembly, the cup assembly chain 26 extends around a sprocket concentric with the sprocket 21 for the wheel assembly chain 20 but omitted from FIG. 1 for illustrative purposes. However, both the head-end sprocket 21 that engages the wheel assembly chain 20 and the other head-end sprocket that engages the cup assembly chain 26 are secured to a common shaft 27 at the head end of the frame assembly and both sprockets rotate in unison with that shaft.

The cup assembly chain 26 extends substantially the full length of the frame assembly 15 to engage the sprocket 28 mounted in the frame at the tail end 23. A motor 29 is located in the frame assembly below the sprocket 28 and is connected to drive that sprocket and the cup assembly chain 26 engaging that sprocket. Because the cup assembly chain 26 at the head end 17 engages the sprocket mounted on the common drive shaft 27 with the head-end sprocket 21 for the wheel assembly chain 20, it will be understood that the motor 29 drives both conveyor chains in synchronism along the frame assembly.

Both the wheel assembly chain 20 and the cup assembly chain 26 are provided in the preferred embodiment by separate roller chains. It will be understood by those skilled in the art that both the wheel assembly chain 20 and the cup assembly chain 26 move through suitable chain guide and support structures shown at 45 and 46 in FIG. 2 and located along the upper and lower extents of the frame structure 15, to guide and support the movement of those chains along the respective partial and full lengths of the apparatus 14. However, the diameter of the end sprocket 22 for the wheel assembly chain 20 is less than the diameter of the head-end sprocket 21 for that chain. An optical inspection apparatus indicated generally at 31 in FIG. 1 is positioned above the apparatus 14 at the location 30 somewhat upstream from the end sprocket 22. The support structure 45 for the wheel assembly chain 20, immediately following the location 30, is angled downwardly on a path generally tangent to me upper side of the end sprocket 22 so that the upper flight of the wheel assembly chain, after exiting the optical inspection apparatus 31 at the location 30, moves downwardly to engage the upper side of the sprocket 22. Suitable optical inspection apparatus for fruit or other agricultural commodities is known in the art and need not be disclosed herein in detail.

Turning next to FIGS. 2-5, it will be seen that the wheel assembly chain 20 carries a number of wheel assemblies 34 and the cup assembly chain 26 carries a number of cup assemblies 35. The wheel assemblies 34 are spaced apart along the wheel assembly chain 20 to accommodate a cup assembly 35 between each adjacent pair of wheel assemblies. Thus, for the initial portion of the apparatus 14 extending from the head end 17 to just beyond the optical inspection apparatus 31, the wheel assemblies 34 are interlaced by the cup assemblies 35 as the conveyor chains 20 and 26 move in synchronism. The wheel assemblies 34 descend from the cup assemblies as the wheel assembly chain 20 descends commencing at location 30 as discussed above. For the remaining extent of the apparatus 14 only the cup assemblies 35 move through a weighing zone 37 and several article discharge zones 38, until the cup assembly chain 26 enters the sprocket 28 and returns with the cup assemblies along the lower side of the frame assembly 15 to the head end 17 of the apparatus 14.

Figure 2:
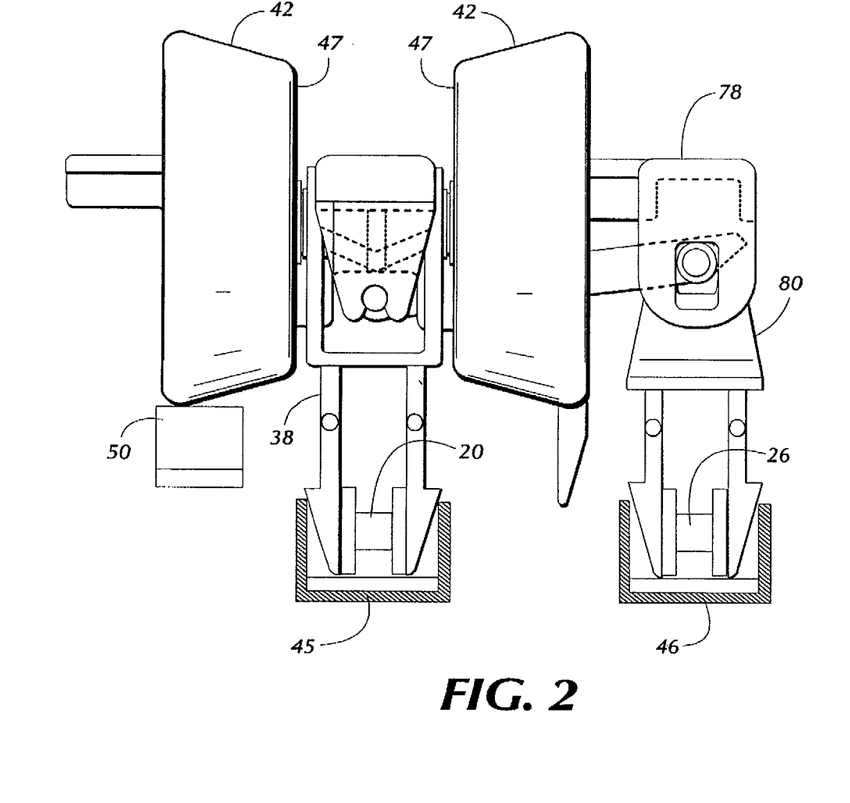
FIG. 2 is a vertical section view taken along line 2—2 of FIG. 1.
Figure 3:
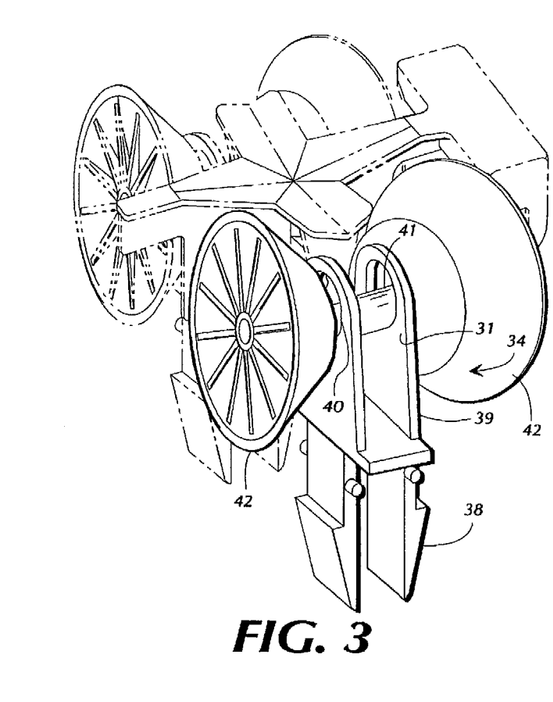
FIG. 3 is a pictorial view of the weigh cup and roller assemblies shown in FIG. 2.

Each wheel assembly 34 includes a wheel mounting bracket 37 best seen in FIG. 3. The lower end 38 of the wheel mounting bracket is configured to snap into and engage a link of the wheel assembly chain 20, best seen in FIG. 2. The upper end of each wheel assembly bracket 37 includes the two laterally spaced-apart wails 39, each wall being parallel to the wheel assembly chain 20 and having an opening 40 through which extends the axle 41 of the wheel assembly. A wheel 42 is attached at each end of the axle 41. The holes 40 in the walls 39 of the bracket 37 are elongated in the vertical direction, allowing the axle 41 and the attached wheels 42 a limited extent of vertical movement relative to the bracket 37 and the wheel assembly chain 20 as that chain conveys the wheel assemblies 34 along the frame assembly 15. The support structure including the track 45 for the wheel assembly chain 20 and the track 46 for the cup assembly chain 25, seen in FIG. 2, is mounted on the frame assembly 15.

The wheels 42 preferably are molded from a suitable elastomeric material such as rubber or a flexible plastic. These wheels are shaped like a truncated cone with the smaller-diameter portion 47 of the wheels on each axle 41 facing each other across the walls 39 of the bracket 37.

Figure 4:
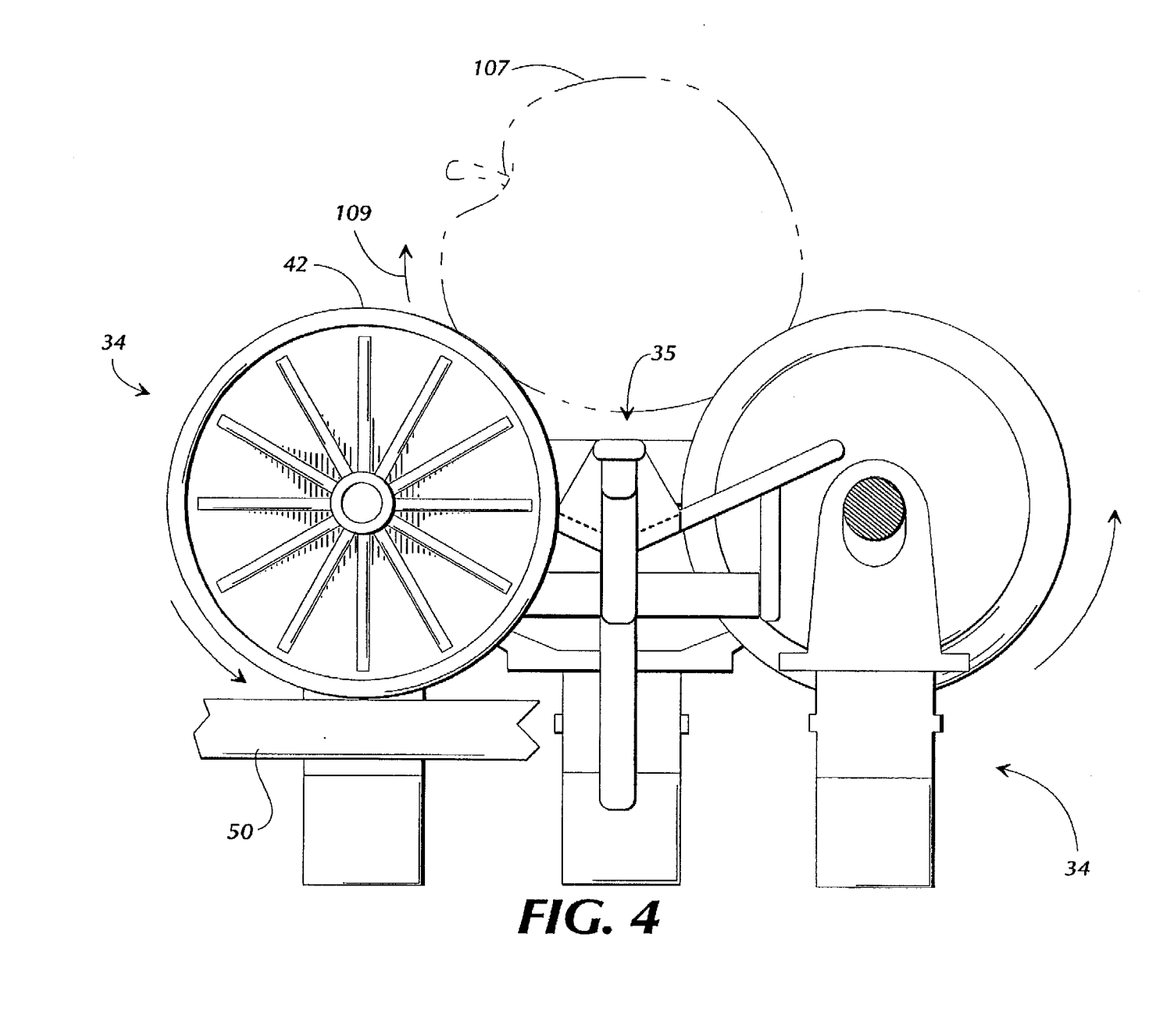
FIG. 4 is a partially-sectioned elevation view of the apparatus taken along line 4—4 of FIG. 5.
Figure 5:
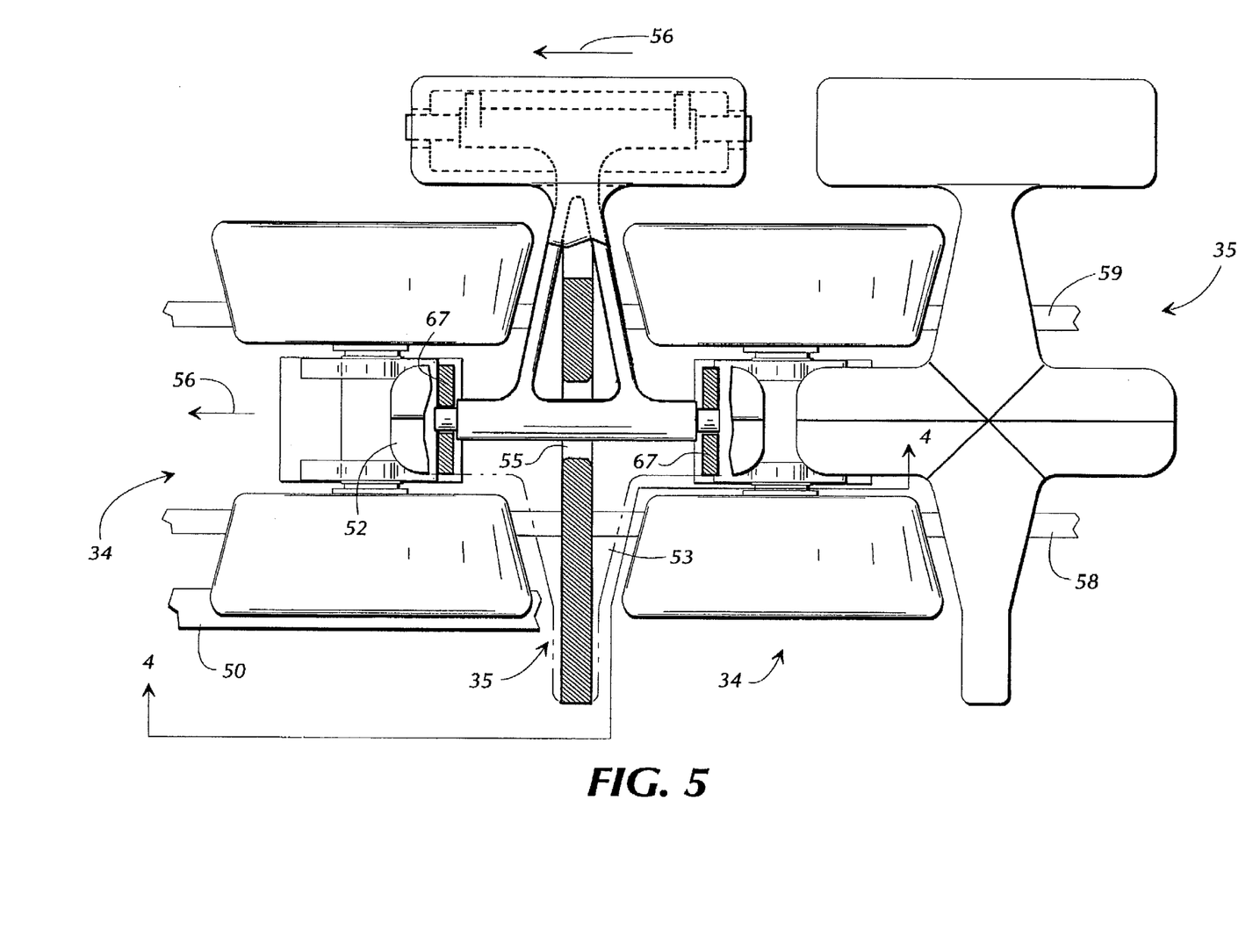
FIG. 5 is a top plan view, shown partially broken away for illustrative purposes, of the apparatus shown in FIG. 2.

A traction bar 50, FIG. 4, is mounted on a portion of the frame assembly 15 coextensive with the optical inspection apparatus 31, to impart rotation to the wheels 42 of each wheel assembly 34 moving past that apparatus. As each wheel 42 of a wheel assembly encounters the stationary traction bar 50, that wheel is rotated and, through the axle 41, rotates the other wheel of that wheel assembly. The vertical elongation of the holes 40 for the wheel axles 41 allow the wheels to move onto and off the traction bar 50 without disturbing the nominal horizontal motion of the wheel assembly chain. The purpose of rotating of the wheels is explained below.

Figure 6:
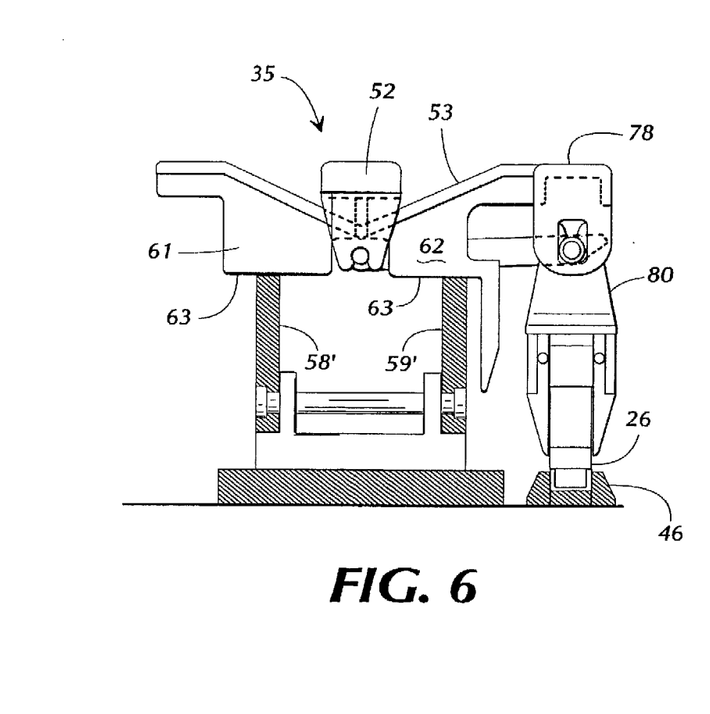
FIG. 6 is a section view taken along line 6—6 in FIG. 1.
Figure 7:
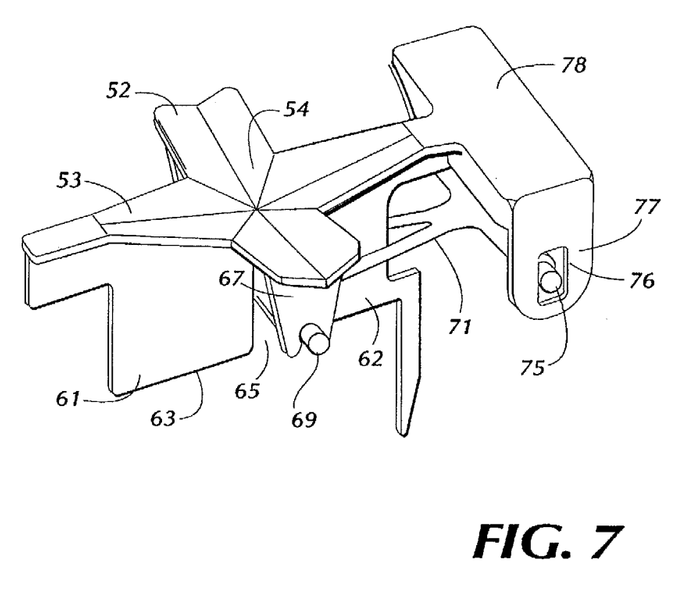
FIG. 7 is a pictorial assembly view of the cup assembly shown in FIG. 6.
Figure 8:
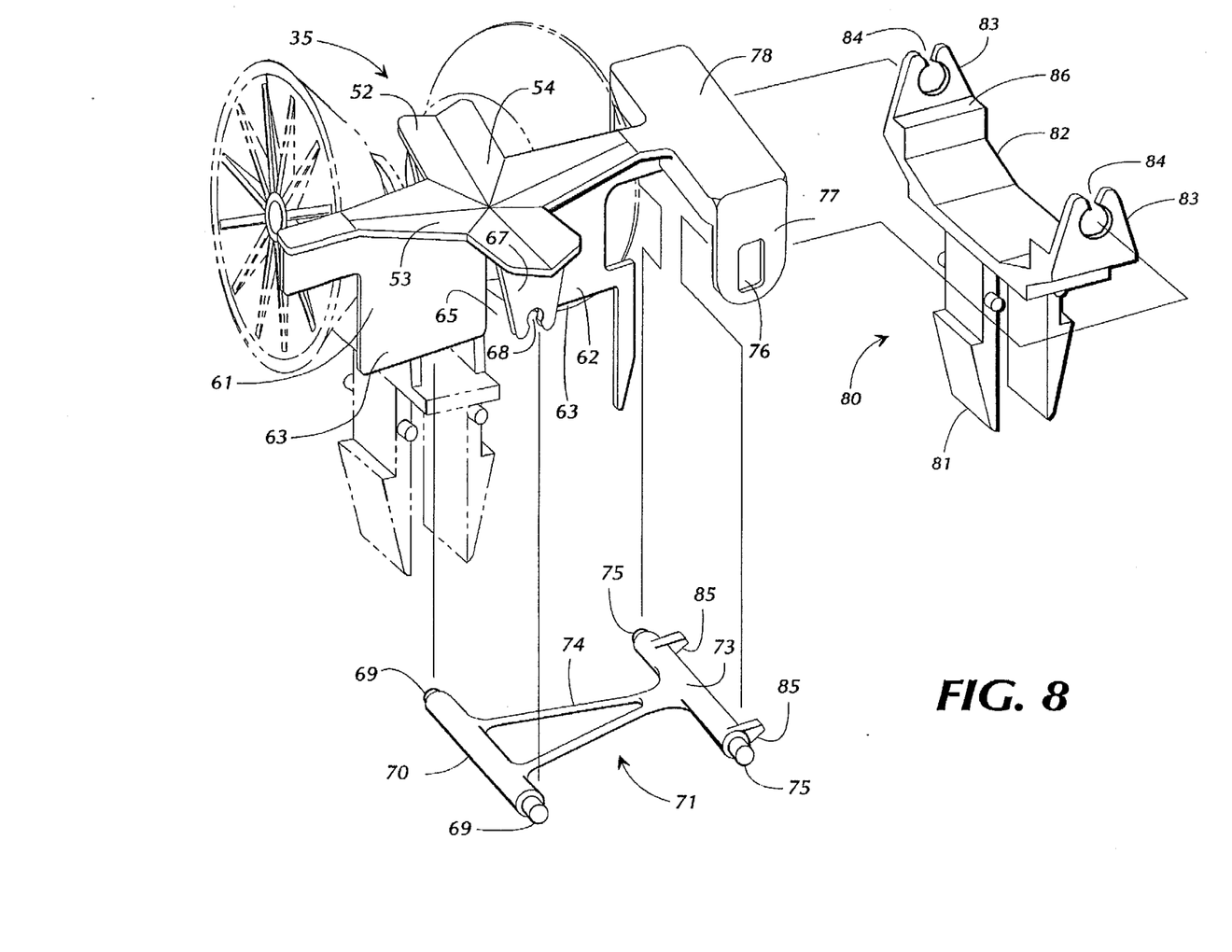
FIG. 8 is an exploded pictorial view of the cup assembly shown in FIG. 7.
Figure 9:
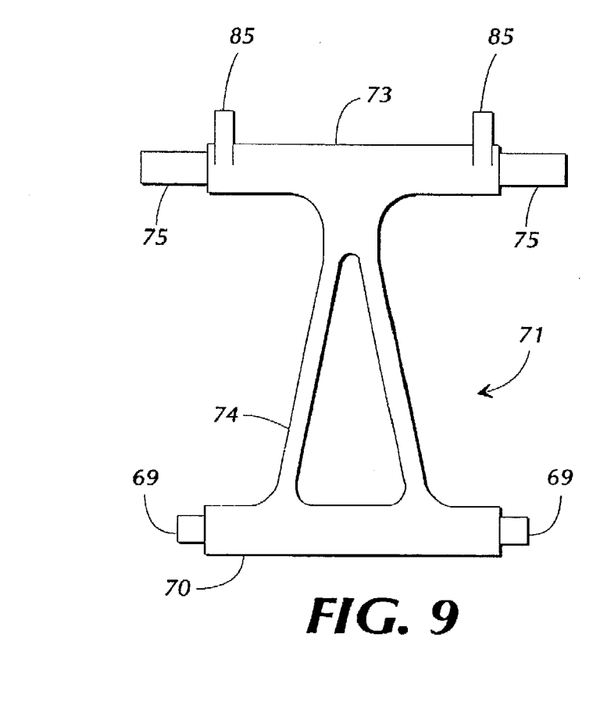
FIG. 9 is a plan view of the stabilizer arm in the disclosed preferred embodiment.

Turning to the cup assemblies 35, those cup assemblies are best seen in FIGS. 6, 7, and 8. Each cup assembly 35 includes a cruciform structure formed by the longitudinal element 52 and the lateral element 53. The upper surfaces of the elements 52 and 53 have shallow depressions, and the juncture of those two elements is depressed to form a somewhat spatulate recess 54 for receiving and supporting individual articles of fruit or the like, as the cup assembly 35 travels along the upper side of the apparatus 14 in the direction 56 shown in FIG. 5. The cup assemblies 35 move along and are supported by a pair of laterally spaced-apart rails 58 and 59, FIG. 5, that extend along the upper portion of the apparatus 14 through the optical inspection zone and the weighing zone 36 downstream from the optical inspection zone. The rails 58 and 59 extend longitudinally in parallel relation to the cup assembly chain 26 that travels outside the fight-hand rail 59, as seen in FIG. 6.

A pair of transversely-extending bars 61 and 62 is formed on the underside of the lateral cup element 53, and those bars likewise extend transversely to the axis of longitudinal movement of each cup. The bars 61 and 62 thus are aligned along the transverse center of gravity of the cup assembly 35 and form a support element, interrupted by the notch 65, located at that center of gravity. The bottom of each bar 61 and 62 terminates in a bearing surface 63 that rests on the top surfaces of the longitudinally-extending rails 58 and 59, thereby effectively supporting the weight of the cup assembly, and of any article received in the recess 54 thereof, on the rails. Because the bars 61 and 62 and the bottom surfaces 63 of those bars are aligned with the transverse center of gravity of the cup 35, the weight of each cup and its contents thus is transferred to the rails 58 and 59 along that center of gravity.

Because the bottom surfaces 63 undergo sliding contact with the top surfaces of the rails 58 and 59, the bars 61 and 62 preferably are made of a suitable plastic material having a relatively low coefficient of sliding friction, thereby minimizing the power requirements of the motor 29 and also reducing frictional wear to the cups and the rails. The width of each bottom bearing surface 63 in the direction parallel to the length of the rails 58, 59 preferably is minimized so that substantially the entire weight of the cup arrives on the weigh platform at the same time, as described below. In a preferred embodiment of the present invention, the width of each bearing bearing surface 63 on the cup assembly is 3/16 of an inch, although that dimension is not considered critical.

The notch 65, FIG. 8, between the bars 61 and 62 is located beneath the longitudinal element 52 of the cup and is coextensive with the longitudinal center line of the cup. A pair of ears 67 extend downwardly from the underside of the longitudinal cup element 52 at locations near the ends of that element, so that the ears are located fore and aft of the notch. An open notch 68 is formed at the lower end of each ear 67, and those notches pivotably receive the rods 69 formed at both ends of the shaft 70 disposed at one end of the stabilizer arm 71. The notch 65 accommodates the shaft 70 extending between the two bars 61 and 62. The rods 69 are a loose snap-fit within the notches 68, with enough play for pivotable movement within those notches but not to allow the rods any appreciable extent of vertical movement within the notches.

The stabilizer arm 71, best shown in FIG. 8, has a second shaft 73 parallel to the first shaft 70 and separated therefrom by the struts 74. A pair of rods 75 likewise extend from the ends of the second shaft 73. Those rods 75 are loosely received within the enclosed openings 76 formed in the tabs 77 extending downwardly from the arm 78 attached at the end of the cup transverse element 53 located above the cup assembly chain 26. The enclosed openings 76 are elongated in the vertical direction as seen in FIG. 8, relative to the diameter of each rod 75, allowing the rods to undergo a predetermined extent of vertical movement within the enclosed openings.

Each cup assembly 35 is attached to the cup assembly chain 26 by a cup chain bracket 80 having a lower portion 81 adapted to engage a link of that chain. The lower end 81 of the cup chain bracket 80 supports a somewhat U-shaped member 82 in longitudinal alignment with the length of the chain 26, and having at each end an upturned ear at the outer extent of which is formed a downwardly-extending open notch 84. The length of the U-shaped member 82, including the ears 83 at each end of that member, is somewhat less than the distance separating the inner surfaces of the tabs 77 formed on the arm 78, allowing the ears 83 to fit between the tabs 77 with the rods 75 snap-fitted in the notches 84 of those ears. The rods 75 thus are free to pivot within the notches 84, but are not allowed any appreciable degree of vertical translational movement within those notches. Flanges 85 are formed at each end of the second shaft 73 and define contact points for engaging the abutment surfaces 86 located just inside the ears 83 on the U-shaped member 82 of the cup chain bracket 80.

The weigh zone 36 of the apparatus 14 includes a pair of rail segments 58' and 59' longitudinally aligned with the rails 58 and 59 on which the cup assemblies 35 travel, but physically isolated from those rails. One of the rail segments is shown at 59' in FIG. 1, and both segments are shown in FIG. 6. As FIG. 1 shows, the entering and exit ends of the rail segments 58' and 59' form ramps leading to a central portion of the rail segment, and that central portion is raised in relation to the rails 58 and 59 at either end of the rail segments. The rail segments 58' and 59' thus form a bridge onto which each cup assembly 35 is moved by the cup assembly chain 26. The rail segments impart force to a load cell 90 located beneath those segments, and the load cell produces an output signal in a known manner indicating the weight of each cup assembly 35 traversing the rail segments.

The discharge zone of the apparatus 14 includes a number of separate discharge stations 93, FIG. 1, at which articles carried by the cup assemblies 35 are selectively discharged from the cups. Each discharge station 93 includes a conveyor 94 at the underside of the discharge station and extending laterally of the apparatus 14, and a discharge wheel 95 to gently move the discharged articles downwardly from the path of the cup assemblies and into the discharge conveyor.

Figure 10:
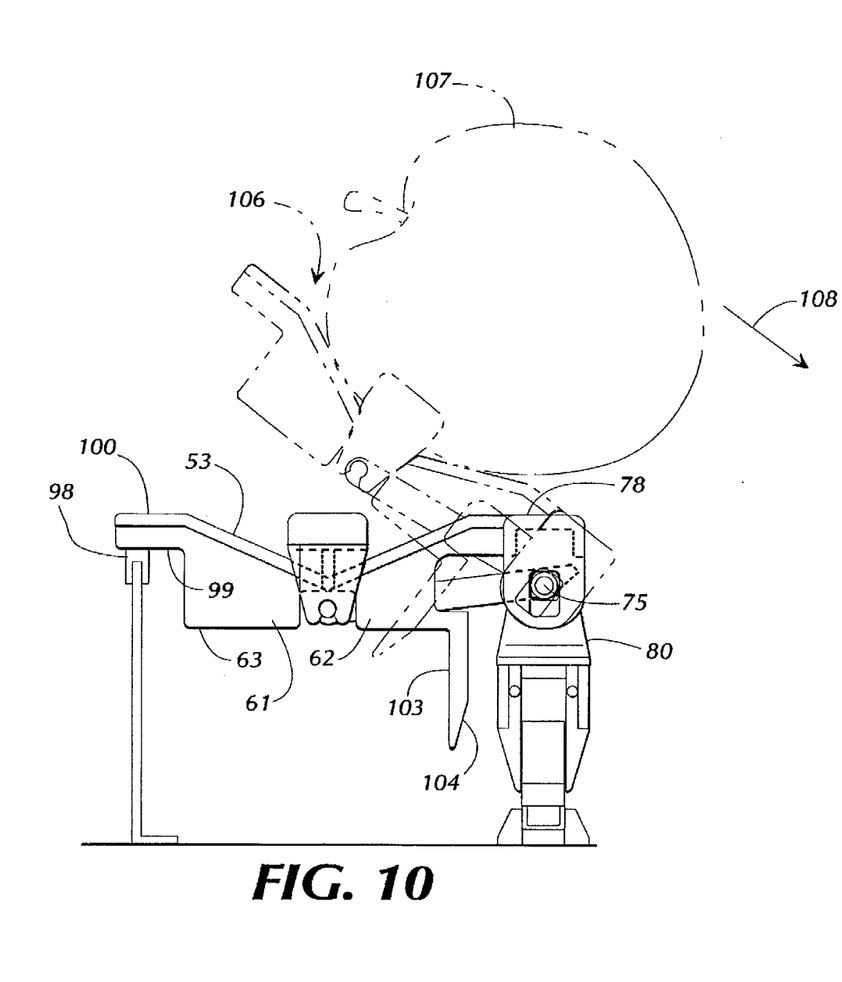
FIG. 10 is a section view taken along line 10—10 of FIG. 1.

Turning to FIG. 10, it will be seen that the weigh cups 35 moving through the discharge zone no longer are supported by the rails 58 and 59. Instead, each cup assembly is supported at one side by the cup chain bracket 80, and at the opposite side by the upstanding support member 98 mounted on the frame assembly 15 of the apparatus and extending parallel to the cup assembly chain 26. Each cup assembly 35 has a bearing surface 99 on the underside of a finger 100, for sliding movement along the support member. The finger 100 of the cup assembly 35 comprises an extension of the lateral element 53 of that cup, on the side opposite to the arm 78 connected at the other end of the lateral element. As best seen in FIG. 10, the bearing surface 99 is elevated above the bearing surfaces 63 of the bars 61 and 62 on the underside of the lateral element 53.

An arm 103 extends downwardly from the underside of each cup assembly 35. As best seen in FIG. 10, the arm 103 is located at the outer side of the bar 62 and may be formed as an extension of that bar. The outside surface 104 at the lower end of the arm 103 is beveled to provide smooth sliding engagement with a cup discharge ramp (not shown) that is selectably movable into the path traveled by the arm 103 as the chain 26 draws the cup assembly 35 through the discharge zone. Those skilled in the art will recognize that the construction and selective operation of such discharge ramps are well-known in article weighing and sorting apparatus of the present kind; selectably actuated by a solenoid or the like, the discharge ramp becomes positioned to engage the lower end 104 of the arm 103 on an oncoming cup assembly, thereby causing the entire cup assembly to pivot to the discharge position 106 shown in FIG. 10 by broken lines. This tipping movement of the cup assembly 35 occurs around an axis defined by the rods 75 of the stabilizer arm 71, pivotably mounted in the notches 74 at the ears 83 of the cup chain bracket 80. An article 107 being carried by the cup assembly 35 thus rolls out of the cup over the smooth upper surface of the arm 78 and is ejected from the cup along a path indicated by the arrow 108, as the cup assembly travels through a selected one of the discharge stations 93.

The operation of the disclosed apparatus is now described. Individual articles of fruit or the like enter the apparatus 14 along the path 18 from upstream equipment as previously mentioned. Each such article 107, shown in phantom in FIG. 4, engages the wheels 42 of two adjacent wheel assemblies 34, as best shown in that figure. The elevation of the wheel assemblies 34, relative to the cup assemblies 35 interlaced with the wheel assemblies moving toward the optical inspection apparatus 31, causes the articles to be supported entirely by the wheels 42, out of contact with the particular cup assembly 35 moving in synchronism with the two adjacent wheel assemblies.

As the wheel assemblies 34 move into engagement with the traction bar 50, each wheel 42 is rotated in the counter-clockwise direction as viewed in FIG. 4, so that the wheels in turn rotate the article generally in the clockwise direction as shown by the arrow 109. The article being carried by the wheel assemblies thus is rotated, as shown by the arrow 109, as the cup assemblies 34 convey that article beneath the optical inspection apparatus 31, FIG. 1.

When the wheel assemblies in turn arrive at the location 30 immediately beyond the point of optical inspection, the cup assembly chain 20 begins moving downwardly to enter the smaller-diameter sprocket 22 as previously mentioned. This downward movement of the cup assembly chain past the location 30 also lowers each wheel assembly 34 beyond that location, while the cup assemblies 35 continue moving on a relatively horizontal path. This downward movement of the wheel assemblies lowers each article 107 into the recess 54 of the cup assembly 35 between each adjacent pair of wheel assemblies. The cup assemblies 35 thus continue moving toward the weigh zone 36, while the wheel assemblies travel around the sprocket 22 with the wheel assembly chain 20 and return to the sprocket 21 at the head end 17 of the frame.

As each cup assembly in turn enters the weigh zone 36, the bearing surfaces 63 on the bottoms of the bars 61 and 62 slide onto the rail segments 58' and 59' associated with the load cell 90. Because those rail segments 58' and 59' are elevated relative to the adjacent rails 58 and 59, each cup assembly 35 becomes elevated as the bars 61 and 62 move onto the rail segments. This elevation raises each cup assembly 35 to an extent that the weight of the cup assembly, including the article carried by that assembly, is supported entirely by the rail segments 58' and 59'. The lost-motion connection provided by the rods 75 within the vertically-elongated openings 76 in the tabs 77 of the cup arm 78, thus allows each cup assembly to float in the vertical direction, independent from the chain bracket 80, as the cup assembly traverses the rail segments associated with the load cell 90. The load cell thus can respond to the entire weight of the cup assembly and the article carried by that assembly.

Because each cup assembly 35 is supported on the rail segments 58' and 59' only by the bearing surfaces 63 coincident with the lateral center of gravity of the cup, the load cell 90 receives the entire weight of the cup as soon as those bearing surfaces move onto the rail segments. This is an important aspect of the present invention, because the load cell (and the signal-processing apparatus connected to that load cell) can be set to begin the settling-out period immediately when the bearing surfaces 63, located at the lateral center of gravity of the cup assembly, enter the rail segments. There is no need for further delay until another load-bearing surface, longitudinally spaced along the rail segments, enters those segments to complete the load-bearing support of the cup assembly. Consequently, the present cup assemblies reduce the amount of time required to obtain an accurate weight reading, permitting a corresponding increase in the travel speed of the cup assemblies and, thus, an increase in the operating efficiency of the apparatus 14.

Because each cup assembly is supported on the rails 58, 59 only by the relatively narrow bearing surfaces 63 aligned with the lateral center of gravity of the cup assembly, those cup assemblies would be inherently unstable and subject to tipping in either a leading or trailing direction as the cup assemblies are moved along the rails. The stabilizer arm 71 overcomes that problem by keeping each cup assembly 35 in a substantially upright attitude while the cup assemblies traverse the rails. The rods 69 at the one end of the stabilizer arm 71 are pivotably movable within the notches 68 on the ears 67, but are not permitted any appreciable vertical movement within those notches. The rods 75 at the other end of the stabilizer arm 71 likewise engage the notches 84 in the ears 83 of the chain cup bracket 80, allowing pivotable movement but substantially no vertical movement of those rods within the notches. The stabilizer arm 71 thus maintains the cup assembly 35 in a substantially upright attitude on the rails 58 and 59, without interfering with necessary vertical movement as each cup assembly moves onto the elevated rail segments 58' and 59' in the weigh zone 36.

Once each cup assembly 35 in turn moves from the weigh zone to a discharge station 93, vertical support of the cup assemblies is provided by the upstanding support member 98 and the finger 100 at one side of the cup assembly, and by the arm 78 and the cup chain bracket 80 at the other side of the cup assembly. The cup assemblies are selectably pivoted to discharge the articles 107 into the appropriate discharge station as previously described.

It should be understood that the foregoing relates only to a preferred embodiment of the present invention, and that numerous changes and modifications thereto may be made without departing from the spirit and scope of the present invention as defined in the following claims.

What is claimed is:

1. In apparatus for sorting articles according to the weight of each article, including a continuous conveyor with successive members for moving article-receiving cups along a path including a weigh zone where individual cups and articles received therein are successively weighed by a weight supporting surface of a weighing scale, the improvement comprising:

support means associated with each cup only along a line crossing the center of gravity of the cup for engaging the weight supporting surface substantially only at the center of gravity of the cup as the cups are moved along the path, so that each cup in succession is supported at the weigh zone only by the support means at the center of gravity of the cup.

2. Apparatus as in claim 1, wherein:

each cup is attached to the conveyor by a connection allowing the support means to support the cup independently of the conveyor while the cup is weighed on the weight supporting surface.

3. Apparatus as in claim 2, wherein:

the connection between the cups and the conveyor comprises a lost-motion connection permitting each cup to undergo a predetermined range of vertical movement independently of the conveyor.

4. Apparatus as in claim 3, wherein:

each cup has an attachment member connecting the cup to the conveyor, the attachment member being in substantial alignment with the support means at the center of gravity of the cup.

5. Apparatus as in claim 1, further comprising:

a stabilizing member associated with each cup to keep the cup in a substantially upright attitude as the cup is supported only by the support means at the center of gravity of the cup.

6. Apparatus as in claim 5, wherein:

each cup has a member attaching the cup to the conveyor;

each stabilizing member extends between the respective cup and the attaching member for that cup; and the stabilizing member is pivotably connected to the cup and to the attaching member so as to allow the support means to support the weight of the cup independently of the stabilizing member while the cup is on the weight supporting surface.

7. Apparatus for weighing a succession of articles, comprising:

a conveyor for moving a plurality of article-receiving cups along a path including a weigh zone where the cups and articles received therein are individually weighed by a weight supporting surface of a weighing scale;

a pair of laterally spaced rails extending along the path of the cups;

the weight supporting surface including a pair of laterally spaced rail segments aligned with the rails;

each cup having a support element traveling on the rails and passing over the rail segments; and the support element being at the center of gravity of the cup on a line transverse to the rails and engaging the rail segments to provide substantially the only vertical support for the cup passing over the rail segments so that the entire weight of each cup in succession is supported at the weigh zone only by the support element at the center of gravity.

8. Apparatus as in claim 7, wherein:

the conveyor comprises a chain movable adjacent one of the rails at the side thereof opposite from the other said rail;

each cup has an arm extending beyond the one rail; and successive brackets are attached to the chain and extend therefrom to the arms of the respective cups for moving the cups along the rails in response to movement of the chain as the cups are supported on the rails only by the support means at the center of gravity.

9. Apparatus as in claim 8, further comprising:

a connection between each bracket and the arm of the corresponding cup operative to allow each cup and its contents to be supported for a predetermined range of vertical movement independently of the chain and bracket as the bars are moved along the rail segments; and a stabilizer member connected to each cup and extending to the corresponding bracket to keep the cup upright on the rails as the cup is supported only by the support element at the center of gravity of the cup.

10. Apparatus as in claim 7, further comprising:

a lost-motion connection between each bracket and the arm of the corresponding cup, so that the support element is operative to support the cup and its contents independently of the chain and bracket as the support element is moved along the rail segments in the weighing zone.

11. Apparatus as in claim 10, further comprising:

a stabilizing member connected to each bracket and extending from the bracket to the respective cup to keep the cup in a predetermined attitude as the cup is supported only by the support element at the center of gravity of the cup.

12. Apparatus as in claim 7, wherein:

the support element for each cup comprises a first bar and a second bar, each bar extending in transverse relation to the rail segments; and the first and second bars riding on the laterally spaced rails and supporting the cup on the rails.

13. Apparatus as in claim 7, wherein:

the rails extend along less than the entire path traveled by the cups while carrying articles therein;

each cup has a support surface on the side opposite the arm; and the support surface extends laterally beyond the support element to engage a cup supporting member disposed along another portion of the path not having the rails, whereby the cup is supported by the support surface as the cup travels along the other portion.

14. Apparatus as in claim 7, wherein:

the conveyor moves adjacent one of the rails; and further comprising an arm associated with each cup and extends in predetermined relation to the conveyor;

successive brackets attached to the conveyor and extending to the arms of the respective cups for moving the cups along the rails;

a stabilizing member engaging the cup at a location spaced apart from the arm and extending from that location for pivotable engagement with the bracket, so that the stabilizing member keeps the cup in a substantially upright attitude as the conveyor and bracket move the cup along the rails supported thereon only by the support element at the center of gravity, while the stabilizing member keeps the cup in a substantially upright attitude as the cup is moved along the rails supported thereon only by the support element at the center of gravity.

15. Apparatus as in claim 14, further comprising:

a slot having a vertical extent and associated with one of the arms of the cup and the stabilizing member;

a rod associated with the other of the arm and the stabilizing member and received in the slot to provide a certain range of lost motion in the vertical extent of the slot, thereby allowing the stabilizing member and the cup to be supported on the rail segments independently of the conveyor.

16. Apparatus as in claim 15, wherein:

each stabilizing member is pivotably attached to the respective bracket and, at the location spaced apart from the arm, to the cup so as to maintain the cup in a substantially upright attitude while the bracket moves the cup along the path, so that the stabilizing member, through the pivotable engagement with the cup, maintains the cup in the substantially upright attitude while the lost-motion engagement between the stabilizing member and the arm of the cup permits the weight of the cup to be supported by the rail segments independently of the bracket and conveyor as each cup successively traverses the rail segments.

17. Apparatus as in claim 14, wherein:

each cup is supported by the respective bracket for selective pivotable movement so as to discharge the article from the cup.

18. An article receiving cup for use with a weighing apparatus of the kind including a weight supporting surface having at least one rail segment and a conveyor for moving the cup along a path including the rail segment, the cup comprising:

a support element providing substantially the only vertical support for the cup moving on the rail segment while the cup is moving along the path; and the support element being at the center of gravity of the cup along a line transverse to the rail segment so that the entire weight of the cup and an article received therein is supported on the rail segment of the weighing apparatus only by the support element at the center of gravity of the cup.

19. A cup as in claim 18, wherein:

the cup has an attachment member for connecting the cup to the conveyor, the attachment member being in substantial alignment with the support surface at the center of gravity of the cup.

20. A cup as in claim 18, further comprising:

a stabilizing member associated with the cup to keep the cup in a substantially upright attitude as the cup is supported only by the support element at the center of gravity of the cup.

21. A cup as in claim 20, wherein:

the cup has a member for attaching the cup to the conveyor;

the stabilizing member extends between the cup and the attaching member and is pivotably attached to the cup and to the attaching member so as to allow the support element to support the weight of the cup independently of the stabilizing member while the cup is on the weight supporting surface.

22. Apparatus for inspecting and weighing articles, comprising:

a frame extending between an article receiving location to an inspection location and beyond at least to a weighing location having a weight supporting surface;

a first continuous conveyor associated with the frame and extending along a path from the article receiving location at least to the weighing location;

a plurality of article-receiving cups operatively associated with the first conveyor for movement along the path including the weighing location, whereat the cups and articles therein are successively weighed;

a second continuous conveyor associated with the frame and extending along a portion of the path from the article receiving location at least to the inspection location but not to the weighing location;

a plurality of article supporting elements operatively associated with the second conveyor for movement along said portion of the path, the article supporting elements being interlaced with the article receiving cups and being elevated relative to the cups so that each article entering at the article receiving location is supported above a particular cup by at least one article receiving element adjacent that particular cup as the elements and cups move along the portion of the path; and means operatively associated with the second conveyor to lower the successive article receiving elements past the inspection location so that the articles become supported by the cups interlaced with the elements, so that the cups carry the articles to the weight supporting surface at the weighing location.

23. Apparatus as in claim 22, wherein:

the article supporting elements each comprise a bracket moved by the second conveyor, and a pair of wheels carried by the bracket and rotatable relative to the bracket so that the wheels of two successive article supporting elements on said portion of the path support an article above the cup interlaced between those successive article receiving elements; and means supported by the frame to rotate the wheels of each successive article support element as the second conveyor moves the article receiving elements at the inspection location.

24. Apparatus as in claim 22, wherein:

the article supporting elements each comprise a bracket moved by the second conveyor, and a pair of wheels carried by the bracket, so that the wheels of two successive article supporting elements on said portion of the path support an article above the cup interlaced between the successive article receiving elements;

the wheels of each pair of wheels being mutually spaced apart on a line transverse to the path; and each cup comprises a lateral element disposed transverse to the path and extending between the pair of wheels on two adjacent article supporting elements, and a longitudinal element disposed parallel to the path and extending into the spaces between the pair of wheels on the two adjacent article receiving elements, so that the lateral and longitudinal elements of each cup receive and support the article previously carried by the wheels of the adjacent article receiving elements, when the elements are lowered past the inspection location.

25. Apparatus as in claim 22, further comprising:

support means associated with each cup at the center of gravity of the cup for engaging the weight supporting surface substantially only at the center of gravity of the cup as the cups are moved along the path, so that each cup in succession is supported at the weighing location only by the support means at the center of gravity.

26. Apparatus as in claim 22, wherein:

each cup is attached to the first conveyor by a connection allowing the support means to support the cup independently of the first conveyor while the cup is weighed on the weight supporting surface.

27. Apparatus as in claim 22, wherein:

the connection between the cups and the first conveyor comprises a lost-motion connection permitting each cup to undergo a predetermined range of vertical movement independently of the first conveyor.

28. Apparatus as in claim 22, further comprising:

a stabilizing member associated with each cup to keep the cup in a substantially upright attitude as the cup is supported only by the support means at the center of gravity of the cup.

29. Apparatus as in claim 28, wherein:

each cup has a member attaching the cup to the first conveyor;

each stabilizing member extends between the respective cup and the attaching member for that cup; and the stabilizing member is pivotably connected to the cup and to the attaching member so as to allow the support means to support the weight of the cup independently of the stabilizing member while the cup is on the weight supporting surface.

* * * * *

US005677516C1

(12) REEXAMINATION CERTIFICATE (4749th)

United States Patent
Leverett (10) Number: US 5,677,516 C1
(45) Certificate Issued: Mar. 11, 2003

(54) ARTICLE WEIGHING AND SORTING APPARATUS WITH IMPROVED WEIGH CUP

(75) Inventor: William H. Leverett, Greenville, GA (US)

(73) Assignee: Durand-Wayland, Inc., LaGrange, GA (US)

Reexamination Request:
No. 90/005,106, Sep. 10, 1998

Reexamination Certificate for:
Patent No.: 5,677,516
Issued: Oct. 14, 1997
Appl. No.: 08/294,641
Filed: Aug. 23, 1994 08/294,641

(51) Int. Cl.$^7$ .................. G01G 13/00; G01G 19/00; B65G 37/00
(52) U.S. Cl. .................. 177/52; 177/145; 198/370.04; 209/593
(58) Field of Search .................. 177/52, 145, 262, 177/263; 209/593, 643; 198/370.04

(56) References Cited

U.S. PATENT DOCUMENTS

| 4,262,807 A | 4/1981 | Leverett ................ 177/52 |
| 4,413,690 A | 11/1983 | Peterson ................ 177/54 |
| 4,660,665 A | 4/1987 | Powell, Jr. ................ 177/145 |
| 4,957,619 A | 9/1990 | Powell, Jr. ................ 177/145 |
| 5,044,504 A | 9/1991 | Powell, Jr. ................ 177/145 |
| 5,244,100 A | 9/1993 | Regier et al. ................ 209/556 |

Primary Examiner—Randy W. Gibson (57) ABSTRACT

Weighing and sorting apparatus for articles such as fruit or the like, and an improved weigh cup for use therewith. The weigh cups move along a predetermined path including a scale that weighs each cup and its contents. The cups are supported on the weigh scale only along a line coincident with the lateral center of gravity of the cup, allowing each weighing operation to commence as soon as that single support for the cup moves onto a weigh platform. Each cup includes a stabilizer arm to maintain the cup in an upright attitude notwithstanding the single support at the lateral center of gravity.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 22–29 is confirmed.

Claims 1, 7, 18 and 19 are determined to be patentable as amended.

Claims 2–6, 8–17, 20 and 21 dependent on an amended claim are determined to be patentable.

New claims 30–36 are added and determined to be patentable.

1. In apparatus for sorting articles according to the weight of each article, including a continuous conveyor with successive members for moving article-receiving cups along a path including a weigh zone where individual cups and articles received therein are successively weighed by a weight supporting surface of a weighing scale, the improvement comprising:
   support means associated with each cup [only along a line crossing] *at* the center of gravity of the cup for engaging the weight supporting surface substantially only at the center of gravity of the cup as the cups are moved along the path, so that *the weight of* each cup in succession is supported at the weigh zone only by the support means at the center of gravity of the cup*; and*
   *the support means is sufficiently narrow to cause the cup to be inheretly unstable as the cup is moved along the weight supporting surface.*

7. Apparatus for weighing a succession of articles, comprising:
   a conveyor for moving a plurality of article-receiving cups along a path including a weigh zone where the cups and articles received therein are individually weighed by a weight supporting surface of a weighing scale;
   a pair of laterally spaced rails extending along the path of the cups;
   the weight supporting surface including a pair of laterally spaced rail segments aligned with the rails;
   each cup having a support element traveling on the rails and passing over the rail segments; [and]
   the support element being at the center of gravity of the cup on a line transverse to the rails and [engaging the rail segments to provide substantially the only vertical support for the cup passing over the rail segments so that the entire weight of each cup in succession is supported at the weigh zone only by the support element] *positioned to engage the rail segments and to support the entire weight of the cup substantially only at the lateral center of gravity of the cup when the cup passes through the weigh zone so that the entire weight of each cup in succession is supported at the weigh zone only by the support element* at the center of gravity*; and*
   *the support element being sufficiently narrow to cause the cup to be inherently unstable when the cup is in motion along the rail segments.*

18. An article receiving cup for use with a weighing apparatus [of the kind] including a weight supporting surface having at least one rail segment and a conveyor for moving the cup along a path including the rail segment, the cup comprising:
   a support element providing substantially the only vertical support for the cup moving on the rail segment while the cup is moving along the path; [and]
   the support element being at the center of gravity of the cup along a line transverse to the rail segment *and being positioned to support the entire weight of the cup and the entire weight of an article received in the cup substantially only along the lateral center of gravity of the cup so that the entire weight of the cup and an article received therein is supported on the rail segment of the weighing apparatus only by the support element at the lateral center of gravity of the cup; and*
   *the support element being sufficiently narrow so as to cause the cup to be inherently unstable as the cup is moved along the rail segment.*

19. A cup as in claim 18, wherein:
   the cup has an attachment member for connecting the cup to the conveyor, the attachment member being in substantial alignment with the support [surface] *element* at the center of gravity of the cup.

30. *An apparatus for sorting articles according to the weight of each article, including a continuous conveyor with successive members for moving article-receiving cups along a path including a weigh zone where individual cups and articles received in the cups are successively weighted by a weight supporting surface of a weighing scale, the improvement comprising:*
   *support means associated with each cup only along a first plane crossing a point corresponding to the center of gravity of the cup, the support means being configured so that, as the cups are moved along the path, the support means engages the weight supporting surface substantially only along a line defined by the intersection of the first plane and the weight supporting surface, so that each cup in succession is supported at the weigh zone by the support means, and wherein the support means is sufficiently narrow to cause the cup to be inherently unstable when the cup is in motion along the path.*

31. *The apparatus of claim 30, wherein the support means is substantially planar.*

32. *The apparatus of claim 30, further comprising:*
   *a stabilizing member associated with each cup to keep the cup in a substantially upright attitude as the cup is supported only by the support means.*

33. *Apparatus for weighing a succession of articles, the apparatus comprising:*
   *a conveyor for moving a plurality of article-receiving cups along a path including a weigh zone where the cups and articles received in the cup are individually weighted on a weight supporting surface of a weighing scale;*
   *a pair of laterally spaced rails extending along the path of the cups;*
   *the weight suporting surface including a pair of laterally spaced rail segments aligned with the rails;*
   *each cup having a support element traveling on the rails and passing over the rail segments;* the support element being positioned substantially only within a vertical plane defined by a point corresponding to a center of gravity of the cup and a line transverse to the rails, the support element engaging the rail segments to provide substantially the only vertical support for the cup passing over the rail segments so that the entire weight of each cup in succession is supported at the weigh zone only by the support element; and the support means is sufficiently narrow as to cause the cup to be inherently unstable when the cup is in motion along the path.

34. The apparatus of claim 33, further comprising:

a stabilizing member associated with each cup to keep the cup in a substantially upright attitude as the cup is supported only by the support means.

35. An article receiving cup for use with a weighting apparatus including a weight supporting surface having at least one rail segment and a conveyor for moving the cup along a path including the rail segment, the cup comprising:

a support element providing substantially the only vertical support for the cup moving on the rail segment while the cup is moving along the path;

the support element being positioned substantially only within a vertical plane defined by a point corresponding to a center of gravity of the cup and a line transverse to the rail segment so that the entire weight of the cup and the entire weight of an article received in the cup are supported on the rail segment of the weighing apparatus only by the support element; and the support element is sufficiently narrow as to cause the cup to be inherently unstable when the cup is in motion along the path.

36. The apparatus of claim 35, further comprising:

a stabilizing member associated with each cup to keep the cup in a substantially upright attitude as the cup is supported only by the support means.

* * * * *